United States Patent
Knickerbocker et al.

(10) Patent No.: US 7,130,522 B2
(45) Date of Patent: Oct. 31, 2006

(54) METHOD AND STRUCTURE FOR TWO-DIMENSIONAL OPTICAL FIBER FERRULE

(75) Inventors: John U Knickerbocker, Wappingers Falls, NY (US); How T Lin, Vestal, NY (US)

(73) Assignee: International Business Machines Corporation, Armonk, NY (US)

( * ) Notice: Subject to any disclaimer, the term of this patent is extended or adjusted under 35 U.S.C. 154(b) by 121 days.

(21) Appl. No.: 10/756,782

(22) Filed: Jan. 13, 2004

(65) Prior Publication Data
US 2005/0152650 A1 Jul. 14, 2005

(51) Int. Cl.
| G02B 6/00 | (2006.01) |
| G02B 6/42 | (2006.01) |
| G02B 6/36 | (2006.01) |
| G02B 6/40 | (2006.01) |
| G02B 6/38 | (2006.01) |
| G02B 6/04 | (2006.01) |
| C03B 37/23 | (2006.01) |

(52) U.S. Cl. ............ 385/137; 385/52; 385/53; 385/54; 385/60; 385/115; 385/116; 385/120; 65/385

(58) Field of Classification Search ........ 385/137, 385/52–54, 115, 116, 120, 60; 65/385
See application file for complete search history.

(56) References Cited

U.S. PATENT DOCUMENTS

| 2,966,719 A | 1/1961 | Park, Jr. | |
| 3,698,923 A | 10/1972 | Stetson e t al. | |
| 4,769,294 A | 9/1988 | Barringer et al. | |
| 5,185,846 A * | 2/1993 | Basavanhally et al. | ..... 385/137 |
| 5,295,213 A | 3/1994 | Ueda et al. | |
| 5,345,529 A * | 9/1994 | Sizer et al. | ......... 385/147 |
| 5,387,474 A | 2/1995 | Mikeska et al. | |
| 5,897,679 A | 4/1999 | Anderson et al. | |
| 6,128,927 A | 10/2000 | Ahrens et al. | |
| 6,133,540 A | 10/2000 | Weiss et al. | |
| 6,158,900 A | 12/2000 | Omiya et al. | |
| 6,332,782 B1 | 12/2001 | Bezama et al. | |
| 6,352,014 B1 | 3/2002 | Goland et al. | |
| 6,422,760 B1 | 7/2002 | Matasek et al. | |
| 6,439,778 B1 | 8/2002 | Cairns | |
| 6,604,866 B1 | 8/2003 | Kang et al. | |
| 6,616,343 B1 | 9/2003 | Katsura et al. | |
| 6,628,000 B1 | 9/2003 | Pham et al. | |
| 6,628,860 B1 | 9/2003 | Van Doorn | |
| 2003/0095759 A1* | 5/2003 | Dautartas et al. | ............ 385/92 |
| 2004/0161205 A1* | 8/2004 | Hengelmolen et al. | ....... 385/78 |

FOREIGN PATENT DOCUMENTS

JP 2000056172 2/2000

* cited by examiner

Primary Examiner—Brian Healy
Assistant Examiner—Jerry Martin Blevins
(74) Attorney, Agent, or Firm—DeLio & Peterson, LLC; John J. Tomaszewski; Ira D. Blecker

(57) ABSTRACT

A method is provided for making ferrules for connecting optical fibers to other optical fibers or to an optical input device such as an optical chip. The method utilizes ceramic greensheets or silicon wafers. In one method, the greensheets are stacked and laminated and then fiber optic through openings are provided in the laminate for holding the fibers. The laminate is then sintered forming the ferrule.

12 Claims, 2 Drawing Sheets

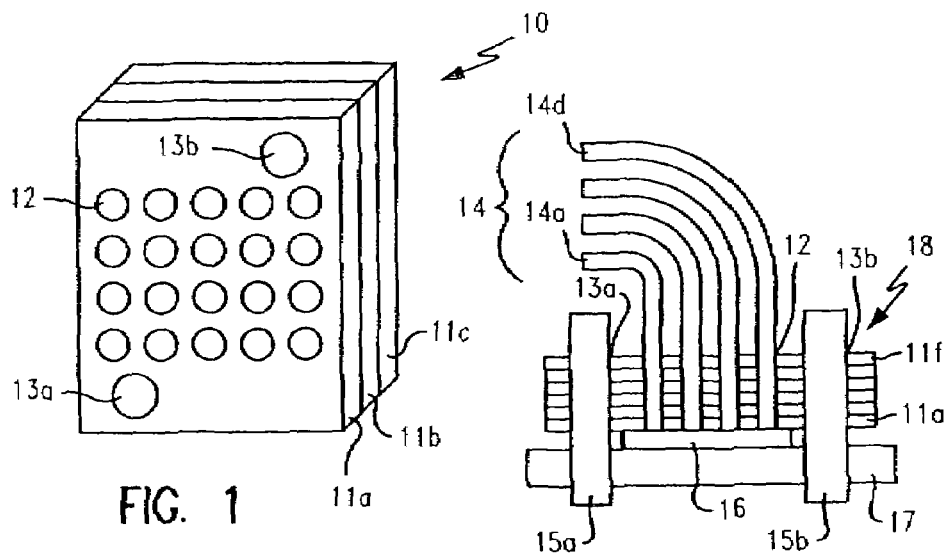
FIG. 1
FIG. 2
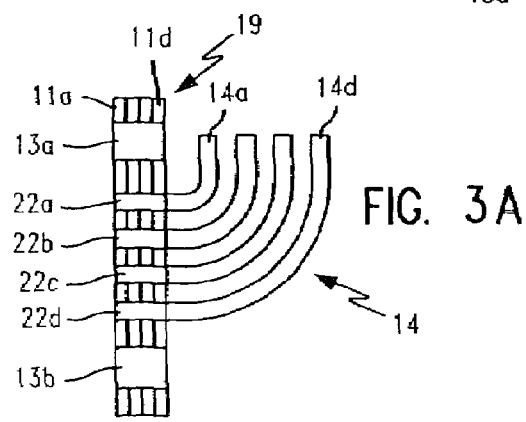
FIG. 3A
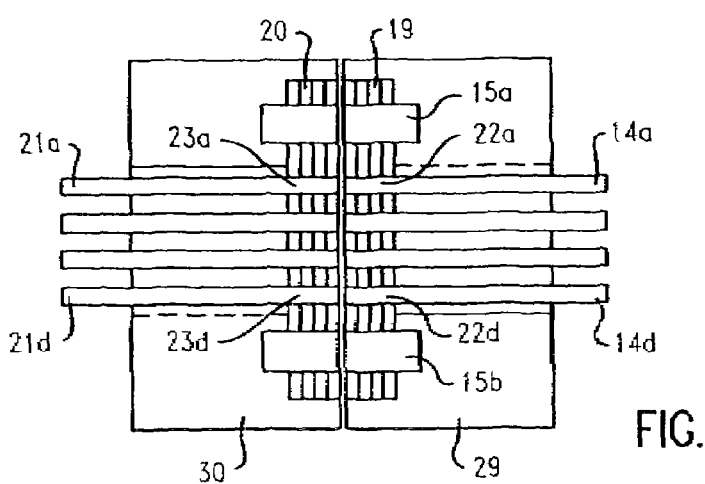
FIG. 3B

METHOD AND STRUCTURE FOR TWO-DIMENSIONAL OPTICAL FIBER FERRULE

BACKGROUND OF THE INVENTION

1. Field of the Invention

The present invention relates to optical fibers and, in particular, to optical fiber connectors which are used for connecting optical fibers to each other and, more particularly, to ferrules used in optical transmissions with optical connectors to hold optical fibers accurately in an area array for low optical loss across to an adjacent optical fiber array, optical waveguide array, optical transmit array, optical mirror and/or optical receive arrays.

2. Description of Related Art

Optical connectors are used in optical communications to couple optical fibers together so that light transmitting from a bundle of one or more fibers of the connector will pass through the connector assembly to corresponding fibers or other optical input for a device connected to the other end of the connector assembly. A ferrule is typically part of the connector, and it is the part of the connector into which the fibers are inserted before the ferrule is inserted into an overall connector assembly. The ferrule holds the fibers in a precise position and ensures that when a connector assembly is attached to a mating connector assembly or some other device that the fibers of the connector assembly are held in consistent alignment. See for example, U.S. Pat. Nos. 6,422,760; 6,439,778; 6,604,866; 6,616,343; and 6,628,000, which patents are hereby incorporated by reference.

An optical fiber positioning member such as a ferrule requires a high dimensional accuracy since they are required to carry out positioning of the respective axial centers of optical fibers to be butted against each other at a high accuracy and also demand a high dimensional stability when they are used over a long period of time. Broadly stated, unlike an electrical connector, an optical fiber connector is required to align exactly the opposed ends of two optical fibers to be connected. The problems however, with known connectors for connecting a plurality of optical fibers is potential misalignment, side loading, and torque in the connection.

In general, ferrules are adapted for the insertion of the leading end of optical fibers to be connected and the connection of two optical fibers is attained by abutting two such ferrules against each other. Specifically, two ferrules each having a leading end of an optical fiber inserted and affixed therein are abutted against each other thereby aligning the axes of the optical fibers. Typically the ferrule is mounted in a connector housing and the outer end face of the ferrule is exposed for face-to-face contact with the ferrule end face of the mating opposite half of the connector. Typically, an optical fiber has about a 125 micron coated diameter and the openings are spaced from each other on the center-to-center spacing ("pitch") of 250 microns.

Conventional ferrules are molded in plastic or epoxy in a 1 by 12 or 2 by 12 array using a common molding technique called transfer molding. However, there is an increasing need among users in the fiber optic field for larger groups of fiber arrays. A small array containing ferrule molded out of epoxy or plastic can conventionally be made but special care must be taken during fabrication when the array becomes larger. Plastic molding technology is very process sensitive for molds having a requisite precision and even small arrays are extremely difficult to make. Additionally, since they are made from organic materials which generally have a large coefficient of thermal expansion, they can be impacted by changes in temperature.

Accordingly, as the array size increases, yield tends to be poor due to the inherent manufacturing process errors that occur in plastics molding. Since the tolerances on these ferrules must be very accurate, high yield manufacture is very difficult when the array size necessitates two rows and exceptionally difficult for more than two rows. Additionally, making ferrules for larger arrays is even more difficult if the holes approach the periphery of the ferrule since the structural integrity of the peripheral walls decreases. In addition, process variations during production cause parts to also have poor tolerance at the periphery. Also, for organic materials and larger connector sizes (for large arrays of optical connections) the distance to neutral point has increased sensitivity to temperature changes and optical loss for connections at the periphery and greatest DNP. In addition, the use of ceramic and/or silicon based reference support for connectors can provide not only X-Y dimensional integrity for the connector but also coplanarity in z direction between mating connector faces to minimize loss between corresponding optical channels compared to other materials used at the connector interface.

SUMMARY OF THE INVENTION

Bearing in mind the problems and deficiencies of the prior art, it is therefore an object of the present invention to provide a multi array ferrule for an optical fiber connector which has dimensional integrity and is cost effective to produce.

It is another object of the present invention to provide a method for making a multi array ferrule for an optical fiber connector wherein the ferrule has dimensional integrity and is cost effective to make.

Still other objects and advantages of the invention will in part be obvious and will in part be apparent from the specification.

The above and other objects, which will be apparent to those skilled in art, are achieved in the present invention which is directed to, in a first aspect, a ferrule and preferably a multi array ferrule for an optical fiber connector comprising:

a multilayer ceramic body having a top, bottom, front and rear sides and opposed sides; and a plurality of optical fiber through openings extending through the body between the top and bottom for holding individual optical fibers.

In another aspect of the invention a method is provided for making a ferrule and preferably a multi array ferrule for an optical fiber connector comprising the steps of:

forming a plurality of greensheets from a ceramic material;

stacking the plurality of greensheets together to a desired thickness the stack having a top, bottom, front and rear sides and opposed sides;

laminating the stack;

forming optical fiber through openings in the stack extending through the top and bottom in the desired pattern for holding individual optical fibers; and sintering the laminated stack to form an optical connector ferrule.

In an additional aspect of the invention, alignment (or registration) pin through openings are provided in the ferrule extending through the top and bottom for aligning one ferrule with an opposed ferrule using an aligning pin extending between the ferrules.

In another aspect of the invention the optical fiber through openings may be tapered through the hole or at the entrance of the opening or have one end wider (entrance) than the other to facilitate insertion of the optical fiber into the through opening.

In a further aspect of the invention the through openings may be provided by laser drilling, photolithography, mechanical punching, precision drilling, laser ablation, etching (e.g., reactive ion etching) or any other means which allow apertures of very small dimensions to be formed. Laser drilling and photolithography are the preferred methods. For large openings, such as 125 micron holes, mechanical punching may provide the most cost effective solution.

In another aspect of the invention, a silicon wafer or silicon wafers can be etched with through holes to support individual or arrays of optical paths to be precisely aligned based on a photolithographic process and silicon through hole etching such as reactive ion etch can be used to create fiber holding channels, precision alignment holes for pin insertion/registration across a connector and adhesive stacking, optical fiber insertion, pin insertion, molding and dicing to create individual connectors. Fabrication could use stacked wafers with and without mating reference pins for each side of the connector.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the detailed description which follows taken in conjunction with the accompanying drawings in which:

FIG. 1 is a perspective view of a multilayer ceramic ferrule of the invention.

FIG. 2 is a cross-sectional view of a bundle of glass fibers inserted in a ferrule of the invention aligned with an optical chip on a chip carrier.

FIG. 3A is another multilayer ceramic ferrule of the invention showing an optical fiber bundle inserted in the ferrule.

FIG. 3B shows the ferrule of FIG. 3A in a ferrule connector which is aligned and connected to another ferrule of the invention in a ferrule connector.

DESCRIPTION OF THE PREFERRED EMBODIMENT(S)

Figure 4:
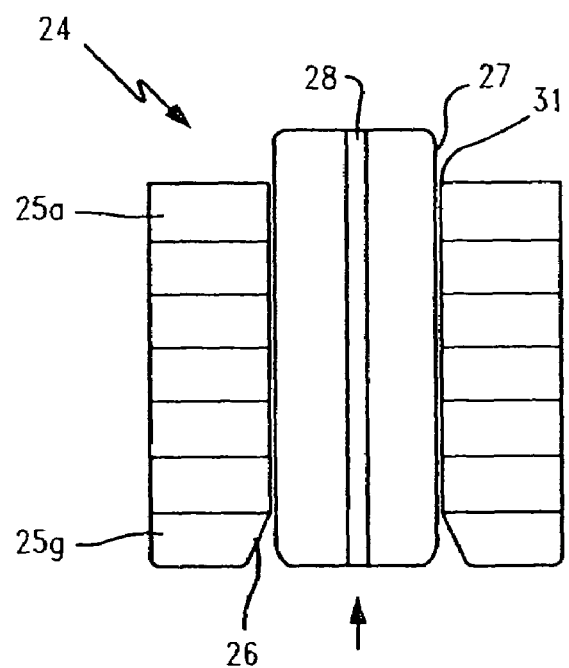
FIG. 4 is another ferrule of the invention showing a tapered inlet for insertion of the optical fiber.

In describing the preferred embodiment of the present invention, reference will be made herein to FIGS. 1–5 of the drawings in which like numerals refer to like features of the invention.

The ceramic greensheet casting composition used to make the ferrules of the invention may be any conventional composition used to make the layers of a multilayer ceramic device (MLC) and may be made using known techniques as described in U.S. Pat. No. 2,966,719 to Park, Jr.; U.S. Pat. No. 3,698,923 to Stetson et al.; U.S. Pat. No. 4,769,294 to Barringer et al. and U.S. Pat. No. 5,387,474 to Mekesha et al., which patents are hereby incorporated by reference.

The composition typically termed a casting slip may be prepared by mixing the ingredients in a ball mill for a number of hours such as 8 hours to ensure that a homogeneous mixture is formed and desired viscosity obtained. A ceramic having the desired particle size and particle size distribution such as alumina is used to make the casting composition. A small portion of glass is often employed as a sintering aid. A binder is used and may be selected from a wide variety of polymers such as polyvinyl butyral, polyvinyl alcohol, or an acrylic resin. The binder is preferably polyvinyl butyral. A solvent is used and may also be selected from the wide variety of materials such as methyl ethylketone (MEK), methyl isobutyl ketone (MIBK), methanol, acetone, toluene, isopropyl alcohol, etc. A plasticizer such as dibutylphthlate is also preferably used in the formulation.

Typically, the slip composition is prepared in a two stage milling process. In the first stage, solvent, binder, and plasticizer are mixed. In the second stage, the ceramic powder is added.

The binder serves to retain the ceramic particles in an undisrupted position as a tape after the solvent is evaporated from the cast slip. A typical conventional ceramic greensheet casting composition by weight % is as follows:

|  | BROAD | PREFERRED |
| --- | --- | --- |
| Glass/Ceramic | 40 to 60 | 45 to 55 |
| Binder | 2 to 10 | 4 to 8 |
| Solvent | 20 to 50 | 35 to 45 |
| Plasticizer | 0.5 to 5 | 1 to 2 |

After the ingredients of the casting composition are mixed and homogenized, such as in a ball mill, a slip is formed having a viscosity which may vary from approximately 400 to 2000 centipoise or more. The slip can be de-aired by means well-known in the ceramic art. After de-airing, the slip is transferred to a slip reservoir where it is suitably maintained in a homogenous state. From the reservoir, the slip is discharged through a small orifice onto a substantially-horizontal flexible tape. The flexible supporting tape is typically a tape made of any impervious material, such as polytetrafluoroethylene "Teflon", glycol tetraphthalic acid polyester (Mylar) and the like. The casting sheet is pulled across the open bottom of the reservoir and under a doctor blade, which is set at a particular height to form the desired substrate thickness. The casting sheet should be supported on a smooth surface and then the solvent vaporized producing a leather hard flexible tape (termed a greensheet). The greensheet can then be punched before or after removal of the casting sheet to the desired substrate size.

Openings may be formed in the greensheets in the desired pattern and then stacked and laminated to form the desired multilayer ceramic substrate ferrule laminate. It is preferred, however, to first form a laminate and then to form the optical fiber through openings and alignment holes. The stack is then fired (sintered) to form the final MLC optical fiber ferrule product.

The ferrules may also be formed by stacking ceramic greensheets and subsequent ceramic process steps or alternatively with silicon wafers using an adhesive to hold the silicon wafer layers together. The silicon wafers would not require sintering like ceramic but rather an adhesive and adhesive curing step depending on adhesive used. Further, as above, the fiber optic openings would be formed before stacking.

Greensheets or silicon wafers having a thickness typically between about 1 and 500 microns may be made using conventional equipment. Typically, about 150–200 micron thick greensheets will be used to form the stack to form the ferrule, which ferrule has a thickness of about 100 to 1,000 microns for alignment portion of the ferrule holding the fibers. The length and width of the ferrule will be dependent on the number of optical connections and the pitch of through openings to be made. For example, an array of 6×8 optical connections for 48 connections if at 250 micron pitch, would provide for a ferrule of about 1.5 mm×2 mm or larger. For wafers the thickness is typically 730 microns to 780 microns per wafer initially but can be thinned to less than 500 microns prior to forming the through holes.

For openings larger than 125 microns mechanical punching is preferred for cost effectiveness in the ceramic process. In multilayer ceramic ferrules, laser drilling and photolithography are preferred for smaller openings (less than 125 microns). For silicon wafer ferrules, etching is preferred.

Sintering of the multilayer ceramic laminate is conventionally performed using any of a number of heating profile cycles. In general, the sintering of ceramic and, especially, alumina based MLC ferrules, is typically performed in three distinct heating phases. The first phase pyrolysis breaks down large polymers and volatilizes the shorter chain organics. Pyrolysis is usually performed at a temperature below 500° C. for about 4–7 hours. The heating cycle where the binder and remaining organics are burned out of the package (termed BBO) is usually performed at a temperature above about 600° C., e.g., 500° C. to 800° C., for about 2–10 hours. Sintering is then completed at a temperature between 900° C. and 1000° C. to form the final MLC ferrule. The total heating cycle is typically performed in a sintering environment which is a reducing atmosphere such as $H_2$ or $H_2$ and $N_2$.

Referring now to the figures, FIG. 1 shows a ferrule of the invention as numeral 10. The ferrule comprises a number of greensheets (shown here as three—11a, 11b and 11c) laminated and sintered together to form the ferrule. Through openings 12 are formed in the ferrule to hold the fiber optic cable or fiber optic core. Alignment pin through openings are shown as 13a and 13b to ensure alignment of the ferrule with another ferrule or other device to which it is to be connected.

FIG. 2 shows another ferrule of the invention as numeral 18. The ferrule comprises a number of laminated and sintered greensheets 11a–11f having a number of openings 12 therein for insertion of the optical fiber bundle shown generally as numeral 14. The optical fiber bundle comprises four (4) optical fibers 14a–14d. Alignment pins 13a and 13b are shown extending through ferrule 18 into substrate chip carrier 17 to ensure proper alignment of the ferrule 18 to the chip carrier 17. The ferrule 18 is positioned adjacent optical chip 16 for optical transmission between optical fiber bundle 14 and optical chip 16.

FIG. 3A shows another ferrule of the invention as numeral 19 and comprises four (4) ceramic greensheet layers 11a–11d. The optical fiber bundle 14 having optical fibers 14a–14d are inserted into their respective openings 22a–22d in the ferrule. Alignment openings 13a and 13b are shown in the ferrule.

FIG. 3B shows ferrule 19 optically connected to ferrule 20, which is another ferrule of the invention. Ferrule 19 has optical fiber openings 22a–22d and ferrule 20 has corresponding optical fiber openings 23a–23d. Alignment pins 15a–15b are shown extending between ferrules 19 and 20 for alignment of the ferrules. Ferrule 19 is carried in ferrule connector 29 and ferrule 20 is carried in ferrule connector 30. Ferrule connectors 29 and 30 are standard and any conventional connector for holding a ferrule may be employed. Note the alignment pins 15a and 15b also extend into the connectors.

As can be seen from FIG. 3B, optical fibers 14a–14d are optically connected to corresponding optical fibers 21a–21d.

FIG. 4 shows a view of another ferrule of the invention shown as 24. Ferrule 24 comprises greensheets 25a–25g laminated and sintered together to form the ferrule. Greensheet 25g has a taper 26 to allow easier insertion of optical fiber 27 into the opening of the ferrule in the direction of the arrow. The optical fiber 27 has an optical fiber core 28.

Figure 5:
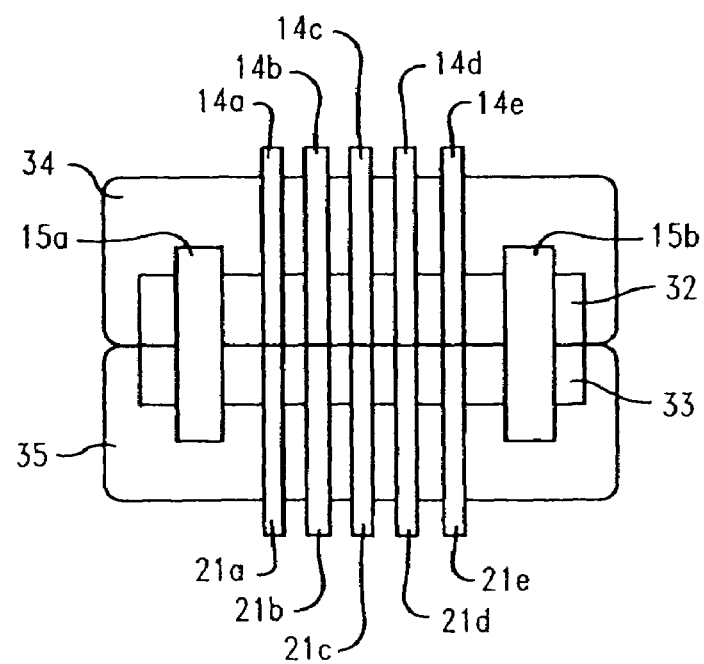
FIG. 5 is another ferrule of the invention showing a molding beyond precision alignment features for handling integrity.

FIG. 5 shows optical ferrule of the invention 32 optically connected to optical ferrule of the invention 33. The ferrules are made from ceramic or silicon (wafer) as described above. Ferrule 32 supports and holds optical fibers 14a–14e and ferrule 33 supports and holds optically connected fibers 21a–21e. Fiber supports 34 and 35 hold and support the portion of the optical fibers not held in the ferrule and may be formed (molded) from a polymer (molding compound) such as an epoxy or cyanite ester material.

While the present invention has been particularly described, in conjunction with a specific preferred embodiment, it is evident that many alternatives, modifications and variations will be apparent to those skilled in the art in light of the foregoing description. It is therefore contemplated that the appended claims will embrace any such alternatives, modifications and variations as falling within the true scope and spirit of the present invention.

What is claimed is:

1. A method for making a ferrule for an optical fiber connector comprising the steps of:
    forming a plurality of greensheets from a ceramic material;
    stacking the plurality of greensheets together to a desired thickness the stack having at least a top layer and a bottom layer, front and rear sides and opposed sides;
    laminating the stack;
    forming optical fiber through openings in the stack extending from the top layer to the bottom layer in the desired pattern; and
    sintering the laminated stack to form an optical connector ferrule.

2. The method of claim 1 wherein the optical fiber through openings are formed in each greensheet before the stack is laminated.

3. The method of claim 1 wherein the optical fiber through openings are tapered.

4. The method of claim 1 wherein the optical fiber through openings are tapered at the entrance of the opening.

5. The method of claim 1 wherein the optical fiber through openings are wider at the entrance of the opening.

6. The method of claim 1 wherein the optical fiber through openings are made by laser drilling, photolithography, mechanical punching, precision drilling, laser ablation or etching.

7. The method of claim 6 wherein the optical fiber through openings are made by mechanical punching, laser ablation or etching.

8. The method of claim 1 further comprising forming alignment pin through openings extending through the body from the top layer to the bottom layer.

9. A method for making a ferrule for an optical fiber comprising the steps of:

forming a plurality of ferrule layers from a ceramic material greensheet or silicon wafer;

stacking the ferrule layers to a desired thickness, the stack having at least a top layer and a bottom layer, front and rear sides and opposed sides;

securing the layers to hold the stack together; and forming optical fiber through openings in the stack extending from the top layer to the bottom layer in the desired pattern forming the ferrule.

10. The method of claim 9 wherein the through openings are formed in each layer before stacking.

11. The method of claim 9 wherein the ceramic greensheets are sintered after forming the through openings.

12. The method of claim 9 further comprising forming fiber supports for a portion of the optical fibers not held in the ferrule.

\* \* \* \* \*